United States Patent [19]
Hatch et al.

[11] 3,966,522
[45] June 29, 1976

[54] METHOD OF MAKING WOVEN ACOUSTICAL PANEL

[75] Inventors: Donald M. Hatch, Huntington Beach; George D. Lee, Monterey Park, both of Calif.

[73] Assignee: Hitco, Irvine, Calif.

[22] Filed: May 23, 1974

[21] Appl. No.: 472,670

[52] U.S. Cl. .................................. 156/148; 28/76 T; 156/155; 156/242; 181/33 G; 181/33 GA; 181/33 H; 264/317
[51] Int. Cl.² ................................................ B32B 5/08
[58] Field of Search ............... 181/33 G, 33 GA, 30, 181/33 H; 112/402, 403; 28/76 R, 76 T; 139/408–410; 161/90–93; 210/507–509; 55/522, 527, 528; 156/155, 148, 242; 264/317, DIG. 44, 49

[56] References Cited
UNITED STATES PATENTS

| | | | |
|---|---|---|---|
| 2,607,104 | 8/1952 | Foster | 181/33 G UX |
| 3,132,099 | 5/1964 | Eilhauer | 156/155 X |
| 3,481,427 | 12/1969 | Dobbs et al. | 181/33 R |
| 3,502,171 | 3/1970 | Cowan | 181/33 R |
| 3,602,964 | 9/1971 | Currier et al. | 139/410 X |
| 3,690,606 | 9/1972 | Pall | 181/33 G UX |
| 3,756,346 | 9/1973 | Parker | 181/33 H X |

Primary Examiner—John F. Gonzales
Attorney, Agent, or Firm—Fraser and Bogucki

[57] ABSTRACT

Acoustical panels are comprised of woven fabrics which have at least one face ply portion woven of warp and fill yarns comprising yarns of non-fugitive and fugitive material. The fabric is woven relatively densely to facilitate handling and use thereof in fabrication of the acoustical panel. The substantial disintegration of the fugitive strands of yarn at the completion of the fabrication process provides a selected porosity in the face portion of the woven fabric for controlled transmission of sound waves into the interior of the panel.

In a preferred method of making an acoustical panel, the fabric is woven of yarns comprising a mixture of non-fugitive and fugitive material. After installation of porous acoustical elements into pockets formed in the face portion and insertion of mandrels into flutes formed within the fabric, the fabric is impregnated with resin, cured, and the mandrels removed. The formed panel is then heated to a temperature sufficient to burn out the fugitive yarns without affecting the non-fugitive yarns to provide the face portion with a desired porosity to sound waves.

18 Claims, 9 Drawing Figures

U.S. Patent   June 29, 1976   Sheet 1 of 2   3,966,522
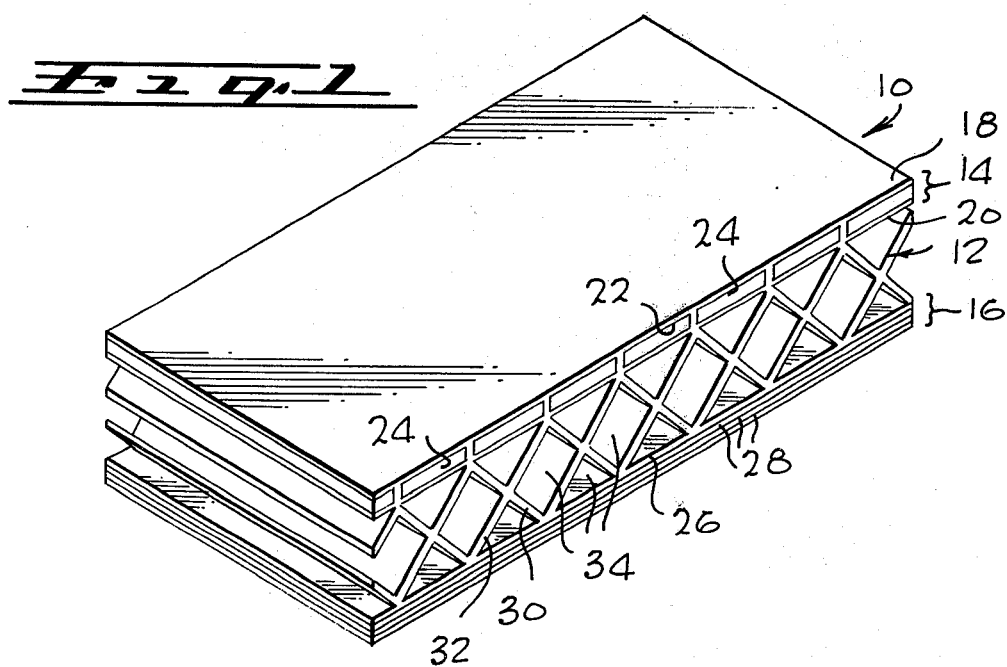
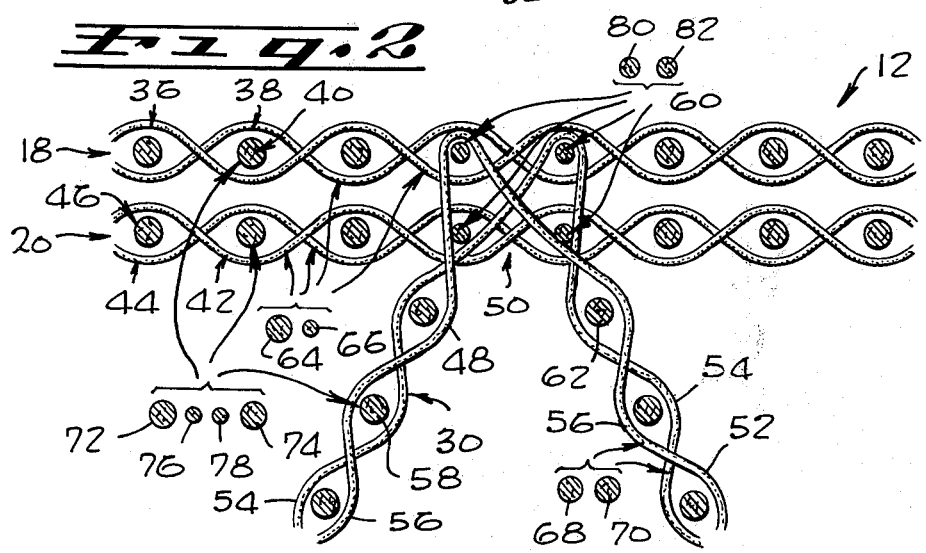
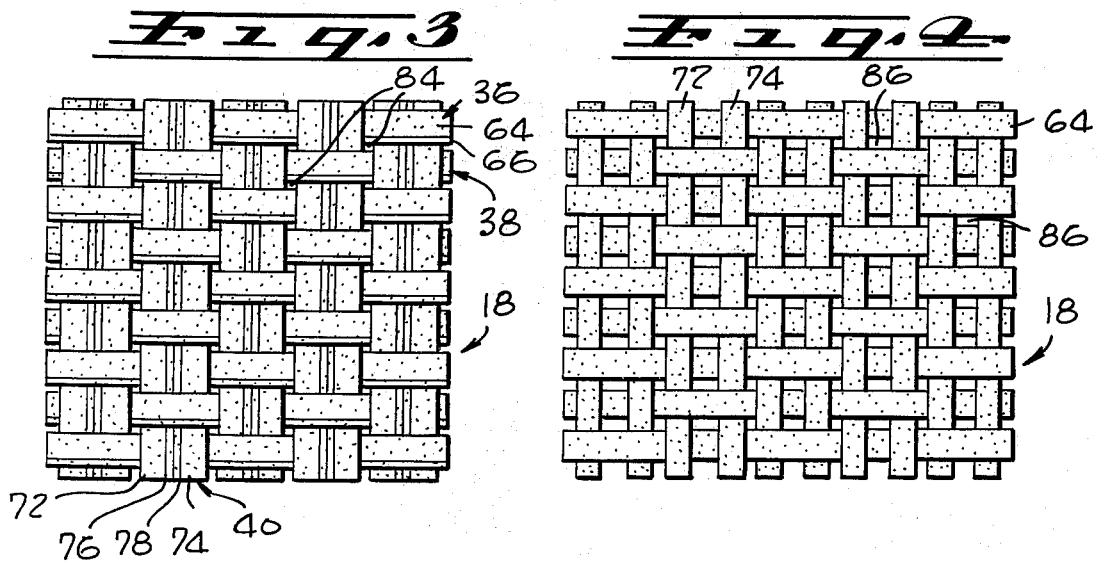

METHOD OF MAKING WOVEN ACOUSTICAL PANEL

BACKGROUND OF THE INVENTION

1. Field of the Invention

The present invention relates to acoustical structures for absorbing sound waves, and more particularly to acoustical panels comprised principally of a woven fabric and having one or more face portions for transmitting sound waves into a hollow interior of the panel.

2. History of the Prior Art

Acoustical panels of the type which are comprised principally of a woven three-dimensional fabric have found widespread use for many applications. In such panels the fabric is typically woven so as to comprise opposite face plies interwoven with intermediate rib plies. At least one of the face plies is made porous to a desired extent to transmit sound waves into the hollow interior of the panel. Examples of panels of this type are provided by U.S. Pat. No. 3,147,820 of Finger and U.S. Pat. No. 3,700,067 of Dobbs et al.

One problem with panels of this type is that of being able to control the porosity of the woven fabric during manufacture of the panel so as to provide the face plies and in some cases selected ones of the interior rib plies with an optimum degree of porosity upon completion of the panel. As the fabric is impregnated with resin and subjected to elevated temperatures and pressures to cure the resin, the porosity of the fabric is very difficult to control. The individual yarns of the fabric tend to flatten out during curing, often resulting in the resin flowing into and hardening in the spaces between the yarns so as to make the fabric virtually impervious to sound waves. One technique, described in the Dobbs et al patent referred to above, is to use high twist yarns in weaving the fabric. The high twist yarns resist flattening during the curing process and thereby maintain at least some porosity in the acoustical panel. An alternative approach as described in U.S. Pat. No. 3,756,346 of Parker is to serve or braid the yarns prior to weaving the fabric.

For certain applications it may be desirable or essential that the acoustical panel also be provided with adequate structural strength and rigidity. For example such panels may be required to be used in locations where they must not only absorb sound waves but where they are also walked upon or otherwise subjected to substantial loads. Still other panels may be used in underwater applications where they must be capable of absorbing sound waves while at the same time withstanding the severe pressures encountered at lower depths. One arrangement which provides an acoustical panel of substantial strength and rigidity is described in a co-pending application, Ser. No. 290,542, Donald M. Hatch and George D. Lee, Multi-Ply Woven Article Having Acoustical Elements Between Double Plies, filed Sept. 20, 1972 and assigned to the assignee of the present application. In application Ser. No. 290,542, flat, planar acoustical elements of substantial rigidity are inserted between the parallel face plies of the woven fabric. The acoustical elements are provided with a selected number of holes of selected size to maintain optimum porosity.

The various structures referred to above utilize various techniques in providing a woven acoustical panel with both porosity and structural strength. However, it would be desirable to have available alternative techniques for manufacturing such structures, particularly when the difficulties in using many of these prior techniques are considered. In particular it would be desirable to provide the woven fabric with a selected optimum porosity at the end of the manufacturing process in a positive and accurate fashion. At the same time the woven fabric should have sufficient buld and density so as to be readily handled without causing distortion of the acoustic face weave during manufacture of the panel and so as to support and complement the other components of the panel during manufacturing to provide a favorable result.

BRIEF DESCRIPTION OF THE INVENTION

Acoustical structures according to the invention comprise a hollow body having at least one surface portion which includes a mixture of non-fugitive and fugitive materials. Near the end of the manufacturing process the structure is subjected to a treatment resulting in substantial disintegration of the fugitive material without affecting the non-fugitive material. The disintegrating fugitive material forms a selected number of apertures of selected size in the surface portion. These apertures provide the surface portion with an optimum porosity for transmission of sound waves into the hollow interior of the structure.

In woven acoustical panels according to the invention one or more plies of one of the face portions of the fabric are woven with warp and fill yarns comprising a mixture of non-fugitive and fugitive yarns. Accordingly the fabric can be woven relatively densely so as to thereafter facilitate handling without distortion of the acoustic face weave and use during manufacture of the acoustical panel. For certain applications it is desirable to enhance the overall strength and rigidity of the resulting panel by inserting relatively stiff elements into pockets formed between opposing face plies of the face portion. The elements are provided with a desired degree of porosity so as not to interfere with the transmission of sound waves through the face portion. With these acoustical elements installed in place, mandrels are installed in the flutes formed by the face plies and interconnecting rib plies and the fabric in impregnated with resin and cured; following which the mandrels are removed. Thereafter the panel is subjected to a heat treatment which substantially disintegrates the fugitive yarns to the exclusion of the nonfugitive yarns. This may be done by using a first material which burns up at a relatively low temeprature as the fugitive material and a second material which burns up only at an extremely high temperature and which has the other desirable properties for the acoustical panel as the non-fugitive material. The panel is then heated to a temperature range which provides for substantial burn-out of the fugitive yarns without affecting the non-fugitive yarns.

Use of a mixture of fugitive and non-fugitive materials enables very close control of the porosity of the fabric during the manufacturing process. In addition use of such materials allows the fabric to be woven relatively densely. The various yarns are woven densely enough to resist flattening during curing. Moreover the relatively dense fabric provides a substantial structure which greatly facilitates ease of the manufacturing process.

BRIEF DESCRIPTION OF THE DRAWINGS

The foregoing and other objects, features and advantages of the invention will be apparent from the following more particular description of preferred embodiments of the invention, as illustrated in the accompanying drawings, in which:

FIG. 1 is a perspective view of a woven acoustical panel according to the invention;

FIG. 2 is a diagrammatic illustration of a portion of the panel of FIG. 1 illustrating some of the details of fabric interweaving as well as the compositon of the various yarns;

FIG. 3 is a plan view of a section of woven fabric prior to substantial disintegration of the fugitive yarns;

FIG. 4 is a plan view corresponding to that of FIG. 3 but after the fugitive yarns have been substantially disintegrated;

DETAILED DESCRIPTION

Figure 5:
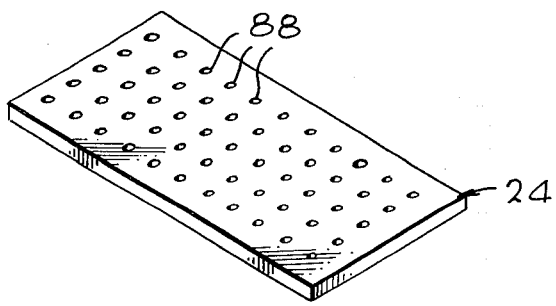
FIG. 5 is a perspective view of an acoustical element for use in the panel of FIG. 1.

FIG. 1 illustrates a woven acoustical panel 10 according to the invention, the panel 10 being comprised principally of a three-dimensional woven fabric 12. The panel 10 is of relatively thin, generally planar configuration and includes a pair of spacedapart, generally planar faces 14 and 16. The face 14 comprises a pair of spaced-apart, planar, parallel face plies 18 and 20 defining a plurality of thin, planar pockets 22 therebetween. A different acoustical element 24 of size and shape similar to the pockets 22 is disposed within each of the pockets 22. The face 16 comprises a face ply 26 of thin, planar configuration having a plurality of thin, planar reinforcing elements 28 mounted thereon.

The opposite faces 14 and 16 are joined by a pair of intermediate rib or web plies 30 and 32. Each of the rib plies 30 and 32 alternately extends between thhe opposite faces 14 and 16 in zig-zag fashion. The rib plies 30 and 32 are staggered relative to one another so as to form rib segments of generally X-shaped cross-section between the faces 14 and 16. The rib plies 30 and 32 divide the hollow interior of the panel 10 into a plurality of chambers or flutes 34.

The acoustical panel 10 of FIG. 1 effectively absorbs and dissipates sound waves. In addition the panel 10 has substantial strength and rigidity so as to also be capable of functioning as a highly effective structural member. The face plies 18 and 20 as well as the intermediate acoustical elements 24 are relatively porous so as to readily pass sound waves from outside the panel 10 into the interior flutes 34. At the same time the face plies 18 and 20 which are comprised of woven fabric which has been resin impregnated and cured combine with the relatively stiff acoustical elements 24 to provide the face 14 with additional strength and resistance to compressive forces.

The face ply 26 of the opposite face 16 which is also part of the woven fabric and which has been resin impregnated and cured in provided with a non-porosity as are the reinforcing elements 28 so as to be impervious to sound waves. This tends to prevent sound waves which pass through the face 14 from also passing through the face 16, thereby confining the sound waves within the flutes 34. The reinforcing elements 28 may be comprised of separate pieces of woven fabric which have been resin impregnated and cured, as described hereafter. The face ply 26 is reinforced by the elements 28 to provide the face 16 with adequate strength.

The intermediate ribs 30 and 32 each comprise a woven fabric ply which has been resin impregnated and cured and which is interwoven with the face plies of the opposite faces 14 and 16. As a consequence the ribs 30 and 32 have substantial strength and rigidity so as to resist the various loads to which the acoustical panel 10 may be subjected. The ribs 30 and 32 can be provided with varying degrees of porosity depending on design considerations. In the present example each of the ribs 30 and 32 is comprised of a succession of porous and non-porous portions so as to define distinct sound chambers comprising various ones of the flutes 34. Alternatively, different arrangements of varying porosity may be used, and the ribs 30 and 32 may be made uniformly porous or non-porous, all depending on design considerations. The sound waves which pass freely through the face 14 into the flutes 34 are dissipated within the flutes 34. The flutes 34 may be left open, or where desired, some or all of them may be filled with acoustical absorbing material.

As previously mentioned the face plies 18, 20 and 26 and the rib plies 30 and 32 comprise plies of woven material which are interwoven with one another to form the woven fabric 12. Methods employed to weave fabrics of this type are known in the art. For example, U.S. Pat. No. 3,090,406 of Koppelman et al describes the weaving of a fabric having a single face ply comprising each face and a single rib ply which extends alternately in zig-zag fashion between the face plies. In a co-pending application, Ser. No. 290,543, Multi-Ply Woven Article Having Double Faces, Walter A. Rheaume et al, filed Sept. 20, 1972 and commonly assigned with the present application, a similar structure is described except that at least one of the faces is comprised of a pair of spaced-apart plies forming pockets therebetween as in the fabric of FIG. 1. The weaving of a fabric having two rib plies arranged to form rib portions of X-shaped cross-section as in FIG. 1 is accomplished by adding two more warp yarns and a pair of associated harnesses to the weaving process described in co-pending application Ser. No. 290,543. Also, the woven fabric 12 shown in FIG. 1 comprises but one example of a fabric used in acoustical panels according to the invention, and other fabric configurations can be used in accordance with the invention as described hereafter in connection with FIGS. 7-9.

In a co-pending application Ser. No. 290,542, Multi-Ply Woven Article Having Acoustical Elements Between Double Plies, Donald M. Hatch and George D. Lee, filed Sept. 20, 1972 and commonly assigned with the present application, an acoustical panel is disclosed as comprising a woven fabric of the type disclosed in co-pending application Ser. No. 290,543, and in which stiff acoustical elements are inserted into the pockets formed between the double plies to provide the resulting structure both with desired mechanical properties and with desirable acoustical properties. In structures of the type described in application Ser. No. 290,542 the fabric is typically woven so as to have relatively low density. The stiff acoustical elements tend to hold the structure in the desired shape during fabrication thereof. However, for certain applications or fabrication techniques it is still desirable to be able to work with a relatively dense fabric. In particular, it is desirable in most instances to be able to exercise close control over the ultimate porosity of the woven fabric which plays a large part in determining the ultimate porosity of the acoustical panel. Where densely woven fabric is used, measures must be taken to prevent the individual yarns from flattening too much and in any event to prevent the resin from filling substantially all of the voids between the yarns so as to provide the resulting structure with an unsuitably low porosity. Where loosely woven fabrics are used, the structural properties may be severely lacking, and the resulting porosity, although substantial, may be very difficult to control.

Structures according to the invention provide for the use of a relatively densely woven fabric in the fabrication of acoustical panels, and in any event provide for a porosity which can be closely controlled in the ultimate product. This is accomplished by weaving at least part of the fabric from a combination of non-fugitive and fugitive yarns. The term "fugitive" is used herein to describe materials which experience substantial disintegration when subjected to a particular process. By the same token "non-fugitive" materials are those which are unaffected by the process. By weaving the fabric of combinations of non-fugitive and fugitive yarns, the fugitive yarns may be substantially eliminated at a desired point in the process to provide the resulting structure with a very closely controlled porosity.

FIG. 2 illustrates a portion of the woven fabric 12 of the arrangement of FIG. 1. As seen in FIG. 2 the face ply 18 comprises a pair of warp yarns 36 and 38 interwoven with a plurality of fill yarns 40. The face ply 20 is comprised of a pair of warp yarns 42 and 44 interwoven with a plurality of fill yarns 46. The rib ply 30 is shown as it extends upwardly from the lower face ply 26 (not shown) along a porous portion 48 to an area 50 of interweaving with the face plies 18 and 20 and then along a non-porous portion 52. The rib ply 30 is partially comprised of a pair of warp yarns 54 and 56. The porous portion 48 includes fill yarns 58, the area of interweaving 50 includes fill yarns 60, and the non-porous portion 52 includes fill yarns 62.

In the present example the warp yarns 36, 38, 42 and 44 within the face plies 18 and 20 each comprise a non-fugitive yarn 64 and a fugitive yarn 66. The non-fugitive yarn 64 comprises ECK 37 1/2/2 (electrical grade, continuous filament, size K, 37 weight) fiberglass having a twist of 3.8 S. The fugitive yarn 66 comprises five yarns of 420 denier polypropylene. The four fiberglass yarns comprising the non-fugitive yarn 64 are twisted together, first in pairs and then with the two pairs being twisted to make the complete yarn 64. The five yarns of polypropylene comprising the fugitive yarn 66 are twisted together to form the yarn 66. As in the case of other fugitive and non-fugitive yarn mixtures described hereafter, the yarns 64 and 66 are not twisted around each other but are simply laid side by side during weaving of the fabric 12.

The warp yarns 54 and 56 comprising the rib ply 30 are each comprised of two separate yarns 68 and 70 on non-fugitive material. In the present example each of the yarns 68 and 70 comprisees ECK 37 1/2/2 fiberglass of 3.8 S twist, twisted together in the same fashion as the non-fugitive yarn 64. The warp yarns in the lower face ply 26 (not shown in FIG. 2) are of like construction.

The fill yarns 40 and 46 within the face plies 18 and 20 as well as the fill yarns 58 within the porous portion 48 of the rib ply 30 are each comprised of two non-fugitive yarns 72 and 74 and two fugitive yarns 76 and 78. In the present example each of the non-fugitive yarns 72 and 74 is comprised of ECK 75 1/2/3 fiberglass having a twist of 5.5 S. The yarns thereof are initially twisted together in pairs, following which the three pairs are twisted together. The fugitive yarns 76 and 78 are each comprised of four monofilaments of polypropylene served with nylon, each of the monofilaments being 10 mils in size.

The fill yarns 60 in the area of interweaving 50 and the fill yarns 62 in the non-porous portion 52 of the rib ply 30 each comprise a pair of non-fugitive yarns 80 and 82. Each of the yarns 80 and 82 comprises ECK 37 1/2/2 fiberglass having a twist of 3.8 S. The fill yarns of the bottom face ply 26 (not shown in FIG. 2) are similarly comprised of the two non-fugitive yarns 80 and 82.

Thus, except for the fact that some of the warp and fill yarns comprise mixtures of non-fugitive and fugitive yarns while still other warp and fill yarns are comprised completely of non-fugitive yarns, the woven fabric 12 is the same as those found in the prior art. The weaving process is the same as in the case of prior art fabrics, with the exception that periodically the travel of the shuttle of the loom must be halted and the type of fill yarn changed. While the face plies 18 and 20 and the porous portion 48 of the rib ply 30 are being woven, a fill yarn comprising the non-fugitive yarns 72 and 74 and the fugitive yarns 76 and 78 is used. When the area of interweaving 50, the non-porous portion 52 of the rib ply 30 and the bottom face ply 26 are being woven, a fill yarn comprising the two non-fugitive yarns 80 and 82 is used. Each time a different segment of the rib ply 30 between the opposite faces 14 and 16 is begun, the fill yarn is changed. The same is true of the rib ply 32.

In the present example the face plies 18 and 20 and the porous portion 48 of the rib ply 30 are provided with a controlled amount of porosity upon subjecting the fabric 12 to a treatment which results in substantial disintegration of the fugitive yarns. Alternate portions of the rib plies such as the non-porous portion 52 and the bottom face ply 26 are generally unaffected by the process for eliminating the fugitive yarns and maintain their high density and resulting non-porosity. Also the fill yarns 60 at the areas of interweaving 50 remain unaffected so as to optimize the strength of the woven fabric 12 at the areas where the ribs are interwoven with the face plies.

FIG. 3 is a plan view of the face ply 18 before removal of the fugative yarns. As can be seen the various yarns are relatively tightly woven providing a dense fabric which is ideally suited for handling during fabrication of the acoustical panel 10. A plurality of apertures 85 formed between the fill yarns 40 and the warp yarns 36 and 38 are few in number and of relatively small size. Were it not for the elimination of the fugitive yarns, the apertures 84 would fill with resin upon impregnation and curing of fabric 12, resulting in little or no porosity of the face ply 18 to sound waves.

FIG. 4 shows the same plan view of the face ply 18 but after the fugitive yarns 66, 76 and 78 have been substantially eliminated. As will be seen the face ply 18 has a number of apertures 86 between the remaining non-fugitive yarns 64, 72 and 74. The apertures 86 are not only larger in size but are greater in number than the apertures 84 of FIG. 3. Accordingly the structure of FIG. 4 has a high degree of porosity which is ideally suited for passage of sound waves therethrough. Not only do structures according to the invention enable the provision of one or more piles with a high degree of porosity, but such structures provide for a controlled porosity. The porosity is determined in large part by the relative sizes of non-fugitive and fugitive yarns comprising the various warp and fill yarns of the woven fabric. Accordingly for a given weaving density, the resulting fabric can be made more porous by increasing the size or number or both of the fugitive yarns relative to the non-fugitive yarns and vice versa.

FIG. 5 depicts one of the acoustical elements 24 which are inserted into the pockets 22 between the face plies 18 and 20. The element 24 can comprise virtually any of the constructions shown and described in the previously referred to co-pending application Ser. No. 290,542. In the present example each element 24 is comprised of an open weave of fiberglass. In addition to being provided with a desired amount of porosity such as by way of a plurality of apertures 88 of appropriate number and size, the element 24 is structurally of substantial strength so as to lend considerable strength to the face 14.

Figure 6:
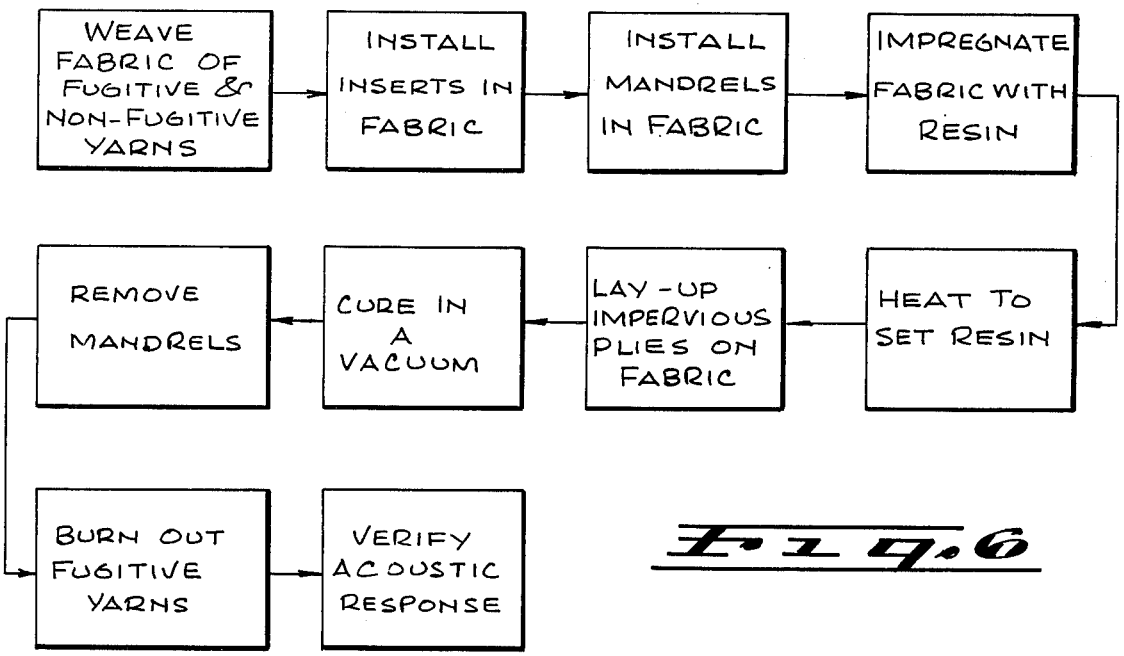
FIG. 6 is a block diagram of the successive steps in one preferred method of making a woven acoustical panel according to the invention.

The successive steps in one preferred method of making an acoustical panel 10 in accordance with the invention are shown in FIG. 6. Initially the fabric 12 is woven of non-fugitive and fugitive yarns using conventional weaving equipment and processes as previously described. Thereafter the acoustical inserts 24 are formed and are installed in the pockets 22 in the fabric 12. Following the mandrels having a cross-sectional configuration approximating that of the flutes 34 are inserted into the flutes 34. The fabric 12 is then impregnated with a resin using conventional application techniques. The resin is then staged by the application of heat. This may be accomplished by placing the fabric 12 and included elements 24 and mandrels in an oven and heating at a temperature of approximately 250°F. for about two and a half hours.

When the resin has been staged the reinforcing elements 28 are added to the face ply 26. In the present example the elements 28 comprise pieces of fiberglass cloth of an appropriate size such as 181 type, 1581 type or 7581 type, which pieces have been preimpregnated with an appropriate resin such as polymide. Next the structure is cured such as by heating in an oven to an appropriate temperature and at a substantially reduced pressure as may be provided by a vacuum bag. In the present example the structure is heated to a temperature of about 325°F. for three to four hours in the presence of a vacuum of at least about 23 inches of mercury. When the cure is completed the mandrels are removed from the flutes 34.

The structure is now ready for removal of the fugitive yarns. This may be accomplished by placing the structure in a high temperature oven and heating to an appropriate temperature range for an appropriate period of time. In the present example the structure is heated to about 600°F. for a period of about five hours. A substantial portion of the fugitive yarns burns out within the first 10 to 15 minutes of this process. However the process is continued for at least several hours to make the disintegration of the fugitive yarns as complete as possible. At the end of about five hours of heating at this temperature only a small percentage, about 2 to 5%, of each fugitive yarn remains.

As a final step the formed acoustical panel 10 is inspected, following which it is typically tested for its acoustical and mechanical properties.

While the non-fugitive yarns in the present example are comprised of fiberglass, non-fugitive yarns in accordance with the invention can be comprised of any appropriate material having the necessary properties. Such yarns, among other things, must be relatively strong, yet easily woven and combined with a resin system, as well as being capable of withstanding the process used to eliminate the fugitive yarns. Similar considerations apply to the fugitive yarns which comprise polypropylene in the present example. The fugitive yarns must have the necessary mechanical properties as well as being substantially eliminated in response to a process such as heating to a particular temperature range. While the resin in the present example comprises a polymide, specifically SKYBOND 703 made by Monsanto Company, other types of resins can be used depending upon their properties, and in particular their temperature characteristics. It has been found that polymide resin is generally well suited for use in accordance with the invention, particularly because it is capable of withstanding the high temperature used to burn out the fugitive yarns without deterioration. Epoxy and phenolic resins may be suitable for certain applications, but tend to experience significant deteriorations within the temperature ranges generally required to burn out most materials of the type suitable for use as the fugitive yarns. Similar temperature considerations are involved in the choice of a material for the fugitive yarns. Materials which require too high a temperature to burn out tend to result in at least some degrading of the resin. Still other materials may burn out at too low a temperature, resulting in inability to cure the resin before eliminating the fugitive yarns.

While the invention has thus far been described in terms of eliminating the fugitive yarns by burning out at high temperature, other techniques could be used such as a chemical wash of the type which dissolves or otherwise substantially eliminates or disintegrates certain materials. The use of high temperature burn-out, however, is advantageous, at least from the standpoint of its integration into the processing steps typically employed in fabricating materials of this type. Since a post-curing step is usually necessary or desirable in order to thoroughly cure and densify the resin, the high temperature burn-out of the fugitive yarns can be readily combined with such operation. Furthermore the use of a wash to remove the fugitive material requires the further step of drying the material before further processing can be done.

As noted above the particular acoustical panel 10 of FIG. 1 provides but one example of panels according to the invention, with a variety of alternative arrangements being possible. For example the configuration of the woven fabric can be varied depending upon a number of factors including mechanical properties required as well as the desired acoustical response. One example of this is provided by the arrangement of FIG. 7. In addition relatively stiff elements of the type shown in FIG. 5 and having varying degrees of porosity can be used in conjunction with double rib plies as well as double face plies as discussed in connection with the example of FIG. 8. Finally, as shown in FIG. 9, the use of stiff elements between double woven plies can be eliminated altogether for certain applications of the invention.

Figure 7:
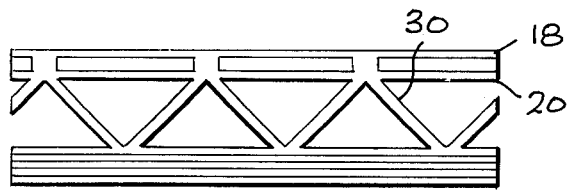
FIG. 7 is a side view of one alternative arrangement of a woven acoustical panel according to the invention.

In the example of FIG. 7 the structure is the same as that of FIG. 1 except for the elimination of one of the rib plies. The structure of FIG. 7 simplifies the weaving process somewhat, but at the expense of some rib strength in the panel. In the arrangement of FIG. 7 the fabric is woven using the method described in the previously referred to co-pending application Serial No. 290,543. The face plies 18 and 20 are preferably woven with a combination of non-fugitive and fugitive yarns so as to have high porosity. The single rib ply 30 is also preferably woven in the manner of the arrangement of FIG. 1 so as to have alternating porous and non-porous portions, although other appropriate arrangements can be used as desired.

Figure 8:
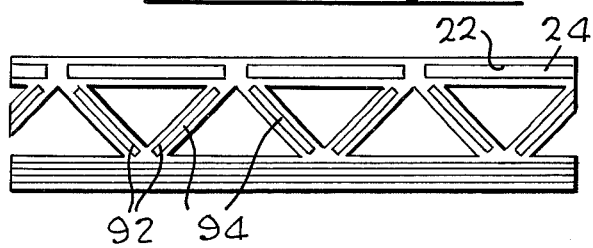
FIG. 8 is a side view of another alternative arrangement of a woven acoustical panel according to the invention.

The arrangement of FIG. 8 is similar to that of FIG. 7 except that the woven fabric comprises double rib plies which are parallel and spaced-apart from one another to form a series of generally planar pockets 92 extending between the opposite faces using the technique described in a co-pending application Ser. No. 290,546, Multi-Ply Woven Article Having Double Ribs, Rheaume, filed Sept. 20, 1972 and commonly assigned with the present application. A plurality of thin, generally planar elements 94 similar to the element 24 shown in FIG. 5 are installed within the pockets 92 at the same time that the elements 24 are installed within the pockets 22. The elements 24 can be porous as in the case of the element 24, or they can be relatively non-porous, or they can be mixed. Previously referred to application Ser. No. 290,542 discusses a similar arrangement in which the elements disposed within pockets between the rib plies are varied in porosity to define particular arrangements of sound chambers within the structure and thereby achieve a tuned acoustical response.

Figure 9:
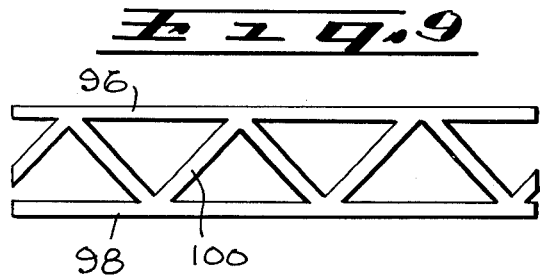
FIG. 9 is a side view of yet another alternative arrangement of a woven acoustical panel according to the invention.

In the example of FIG. 9 the fabric is woven in the manner described in the previously referred to U.S. Pat. No. 3,090,406 of Koppelman et al so as to have single face plies 96 and 98 disposed on opposite sides of an interconnecting rib ply 100. The face ply 96 is woven using a mixture of non-fugitive and fugitive yarns so as to have high porosity. The face ply 98 on the other hand is woven exclusively of non-fugitive yarns so as to be generally impervious to sound waves. The rib ply 100 can be woven using any appropriate mixture of yarns desired to achieve specific effects.

It will thus be seen that acoustical structures in accordance with the invention include a woven fabric having a plurality of different plies. Each ply is comprised of a plurality of different yarn systems, typically a warp yarn system interwoven with a fill yarn system. Each yarn system consists of all of the yarns in a ply extending in a common direction and can consist of all non-fugitive yarns or a combination of fugitive and non-fugitive yarns.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of making an acoustical structure comprising the steps of:
    forming a structure having a surface portion and a hollow interior adjacent the surface portion, the surface portion being comprised of a first plurality of elements of a first type of material which is substantially unaltered when subjected to a given treatment and a second plurality of elements of a second type of material which substantially disintegrates when subjected to a given treatment, the second plurality of elements being disposed between and in the same general direction as the first plurality of elements to define a plurality of spaces of given size between the first plurality of elements;
    processing the formed structure to provide a substantially complete acoustical structure;
    and thereafter subjecting the processed structure to said given treatment to cause substantial disintegration of the second plurality of elements to the exclusion of the first plurality of elements within the surface portion, the substantial disintegration of the second plurality of elements forming apertures of desired size in the spaces between the first plurality of elements to provide for controlled transmission of sound waves through the surface portion and into the hollow interior of the structure.

2. The invention defined in claim 1, wherein said given treatment comprises heating the structure to a temperature within a given range.

3. The invention defined in claim 1, wherein the processing of the formed structure includes the steps of inserting mandrels within the hollow interior of the structure, impregnating the structure with a resin, curing the resin, and removing the mandrels.

4. The invention defined in claim 1, wherein the step of forming a structure comprises weaving the structure, and wherein the first plurality of elements comprise yarns of one type and the second plurality of elements comprise yarns of another type.

5. A method of making a woven acoustical panel comprising the steps of:
    weaving a fabric having opposite face portions and a plurality of intermediate rib portions, one of the face portions being comprised of a plurality of different yarn systems interwoven with each other and defining a plurality of apertures of given size in the one of the face portions, at least one of the different yarn systems comprising a plurality of composite yarns with each composite yarn including at least one yarn of fugitive material and at least one yarn of non-fugitive material;
    processing the woven fabric to provide a substantially complete acoustical panel;
    and thereafter treating the processed woven fabric to cause substantial disintegration of the yarns of fugitive material to the exclusion of the yarns of non-fugitive material to substantially enlarge the size of the plurality of apertures in the one of the face portions.

6. The invention defined in claim 5, wherein the step of processing the woven article includes the steps of providing a plurality of acoustical elements having a selected porosity, and inserting the acoustical elements into pockets formed in the one of the face portions.

7. The invention defined in claim 5, wherein the step of processing the woven article includes the steps of inserting mandrels between the rib portions and the opposite face portions, impregnating the woven fabric with a resin, curing the resin, and removing the mandrels.

8. The invention defined in claim 5, wherein the step of treating the processed woven fabric to cause substantial disintegration of the fugitive material comprises heating the processed woven fabric to a temperature within a given range.

9. The invention defined in claim 5, wherein the plurality of different yarn systems comprise first and second yarn systems interwoven with and disposed generally normal to each other, each of the first and second yarn systems comprising a plurality of composite yarns with each composite yarn including at least one yarn of fugitive material and at least one yarn of non-fugitive material.

10. A method of making a woven acoustical panel comprising the steps of:
weaving a fabric having first and second parallel, spaced-apart, generally planar face plies having a plurality of pockets therebetween, a third generally planar face ply parallel to and spaced-apart from the first and second face plies, and a plurality of rib plies extending between and interwoven with the first, second and third face plies, the rib plies forming flutes between the third face ply and the first and second face plies, the first and second face plies being comprised of yarns, each of which is comprised of both fugitive material and non-fugitive material, the yarns being interwoven with each other;
providing a plurality of generally planar acoustical elements having a controlled porosity;
inserting the acoustical elements into the pockets between the first and second face plies;
inserting a plurality of mandrels into the flutes;
impregnating the fabric with a resin;
curing the resin impregnated fabric; and
heating the fabric to a temperature sufficient to burn out the fugitive material to the exclusion of the non-fugitive material and thereby form apertures of predetermined size in the first and second face plies, the apertures exposing the acoustical elements to the outside of the panel and to the flutes.

11. The invention defined in claim 10, comprising the further step of affixing a plurality of generally planar sheets of non-porous material to the third face ply during curing of the resin impregnated fabric.

12. A method of making a woven acoustical panel comprising the steps of:
weaving a fabric having opposite face portions and a plurality of intermediate rib portions, one of the face portions being comprised of a plurality of warp yarns interwoven with and generally perpendicular to a plurality of fill yarns, each of the warp and fill yarns being comprised of at least one yarn of fugitive material and at least one yarn of non-fugitive material, the one of the face portions being relatively densely woven and being absent apertures of relatively large size;
processing the woven fabric to provide a substantially complete acoustical panel;
and thereafter treating the processed woven fabric to cause substantial disintegration of the yarns of fugitive material to the exclusion of the yarns of non-fugitive material to provide the one of the face portions with a plurality of apertures of relatively large, predetermined size, the apertures passing sound waves from outside the acoustical panel to the inside of the panel in a controlled manner for absorption.

13. The invention defined in claim 12, wherein each of the warp and fill yarns is comprised of a plurality of yarns of fugitive material twisted together and a plurality of yarns of non-fugitive material twisted together and disposed adjacent and in untwisted relation with a plurality of yarns of fugitive material.

14. The invention defined in claim 12, wherein at least some of the intermediate rib portions are woven from warp and fill yarns, each of the fill yarns being comprised of at least one yarn of fugitive material and at least one yarn of non-fugitive material, whereby treating of the processed woven fabric to cause substantial disintegration of the yarns of fugitive material to the exclusion of the yarns of non-fugitive material provides the intermediate rib portions with a plurality of apertures of relatively large, predetermined size, the apertures passing sound waves inside the panel between opposite sides of at least some of the intermediate rib portions in a controlled manner.

15. The invention defined in claim 14, wherein the intermediate rib portions are interwoven with the one of the face portions about common fill yarns comprised entirely of non-fugitive material.

16. The invention defined in claim 14, wherein the intermediate rib portions and the other one of the face portions are each woven from warp and fill yarns, the warp yarns of the intermediate rib portions and the other one of the face portions and the fill yarns of the alternate ones of the intermediate rib portions and the one of the face portions being comprised entirely of non-fugitive material and the fill yarns of the intermediate rib portions between the alternate ones being comprised of at least one yarn of fugitive material and at least one yarn of non-fugitive material, whereby treating of the processed woven fabric to cause substantial disintegration of the yarns of fugitive material to the exclusion of the yarns of non-fugitive material provides the intermediate rib portions between the alternate ones with a plurality of apertures of relatively large, predetermined size, the apertures passing sound waves inside the panel between opposite sides of the intermediate rib portions in a controlled manner between the alternate ones.

17. The invention defined in claim 16, wherein the fabric is woven so as to include a third face portion extending generally parallel to and on the opposite side of the one of the face portions from the other one of the face portions, the third face portion being woven from warp and fill yarns, each of which is comprised of at least one yarn of fugitive material and at least one yarn of non-fugitive material, whereby treating of the processed woven fabric to cause substantial disintegration of the yarns of fugitive material to the exclusion of the yarns of non-fugitive material provides the third face portion with a plurality of apertures of relatively large, predetermined size, the apertures passing sound waves from outside the acoustical panel to the one of the face portions in a controlled manner.

18. The invention defined in claim 17, wherein the step of processing the woven fabric to provide a substantially complete acoustical panel includes disposing a plurality of relatively thin, generally planar elements having holes therein of selected size between the one of the face portions and the third face portion.

* * * * *

UNITED STATES PATENT OFFICE
CERTIFICATE OF CORRECTION

Patent No. 3,966,522    Dated  June 29, 1976

Inventor(s)  Donald M. Hatch and George D. Lee

It is certified that error appears in the above-identified patent and that said Letters Patent are hereby corrected as shown below:

Column 2, line 7, after "sufficient" and before "and", "buld" should read --bulk--; line 45, after "fabric" and before "impregnated", "in" should read --is--; line 49, after "the" and before "yarns", "nonfugitive" should read --non-fugitive--; line 51, after "low" and before "as", "temeprature" should read --temperature--. Column 3, line 12, after "the" and before "of", "compositon" should read --composition--; line 38, after "of" and before the comma (","), "spacedapart" should read --spaced-apart--; line 49, after "between" and before "oppo-", "thhe" should read --the--. Column 4, line 3, after "cured" and before "provided", "in" should read --is--. Column 5, line 68, after "70", "on" should read --of--. Column 6, line 2, after "70", "comprisees" should read --comprises--; line 63, "85" should read --84--. Column 7, line 16, after "Accordingly", insert a comma (--,--). Column 9, line 33, after "elements", "24" should read --94--.

Signed and Sealed this

Nineteenth Day of October 1976

[SEAL]

Attest:

RUTH C. MASON
Attesting Officer

C. MARSHALL DANN
Commissioner of Patents and Trademarks